United States Patent [19]

Sticht

[11] 4,385,685
[45] May 31, 1983

[54] CONTROL AND MONITORING ARRANGEMENT FOR DRIVES OF MOVING MACHINE PARTS

[76] Inventor: Walter Sticht, Attnang-Puchheim, Austria

[21] Appl. No.: 230,379

[22] Filed: Feb. 2, 1981

[30] Foreign Application Priority Data

Apr. 11, 1980 [AT] Austria ................. 1970/80

[51] Int. Cl.³ .............................. B65G 43/08
[52] U.S. Cl. .................... 198/341; 364/468; 364/478
[58] Field of Search ............ 198/339, 341, 855, 857; 364/468, 469, 478

[56] References Cited

U.S. PATENT DOCUMENTS

| | | | |
|---|---|---|---|
| 3,395,459 | 8/1968 | Taylor | 198/341 |
| 4,011,743 | 3/1977 | Peterson et al. | 364/469 X |
| 4,027,246 | 5/1977 | Culloma et al. | 364/468 |

FOREIGN PATENT DOCUMENTS

1386297  3/1975  United Kingdom ............ 364/468

Primary Examiner—James G. Smith
Assistant Examiner—Douglas D. Watts
Attorney, Agent, or Firm—Kurt Kelman

[57] ABSTRACT

A control and monitoring arrangement for drives of moving parts of a machine for the manufacture of structural parts in two or more steps is equipped with controls for the drives. The drives may be pressure fluid operated and they are electrically and/or electronically controlled through switching and control modules. The switching module actuates the drive and the control module cooperated therewith for controlling the actuated drive. A releasable coupling detachably connects the control module to the switching module for ready replacement of the control modules in each control. A monitoring module is connected to, and cooperates with, the control module.

33 Claims, 8 Drawing Figures

CONTROL AND MONITORING ARRANGEMENT FOR DRIVES OF MOVING MACHINE PARTS

The present invention relates to a control and monitoring arrangement for drives of moving parts of a machine for the manufacture of structural parts in two or more steps, and is particularly useful in an assembly line comprising a conveyor for the assembly of workpieces to manufacture the structural parts, the conveyor extending along a series of work stations arranged in linear arrangement, and each work station having one of the drives with the control connected thereto for moving respective ones of the workpieces along the assembly line, and at least some of the work stations having a mechanism with moving parts and drives therefor with the respective controls connected thereto. The controls comprises electrical and/or electronic and pressure fluid operated actuating, control and monitoring means for the various machine drives.

The installation of such controls in manufacturing machines and assembly lines is quite expensive. Usually, the machines or assembly lines are first roughly mechanically finished and the controls are then built into the semi-finished machines. The switching elements for supplying the pressure fluid to the drives, such as solenoid valves controlling the flow of compressed air or hydraulic fluid used for the operation of the drives, are first assembled on special mounts and each valve must be connected separately with the pressure fluid supply line and the pressure fluid return line. Similar procedures are then followed in the installation of the electronic or electric switching, control and monitoring elements. This installation becomes particularly expensive if the machine or assembly line has many moving parts going through complex motions during the manufacture of the structural parts, such as is the case in modern modular assembly line installations. Such automated assembly lines involve a multiplicity of movements of various mechanisms for producing a structural part of a multiplicity of individual workpieces. Since such machines are often designed for the mass manufacture of structural parts, each movement of a respective moving machine part used in the assembly must be held to a very short time span so as to increase the number of movements in a given time period, such as one working shift, to a maximum. The complexity of the controls involves the probability of sometimes frequent repair work on the controls. To decrease the dead time of the machine and the corresponding loss in production to a minimum, it is desirable, of course, to minimize the time for the repairs. With this in view, it has been proposed to incorporate the electrical or electronic components of the control into printed circuit switching units or integrated circuits so that damaged control parts may be replaced and repairs may thus be simplified. However, even this improved control arrangement has required a plurality of terminal bars to which the electrical connecting lines to the switching, control and monitoring elements had to be connected. This makes the installation still quite expensive although the power supply for such a control arrangement is received from a central power source.

Similar considerations apply to the pressure fluid operated switching elements. According to Austrian Pat. No. 278,460, this part of the control has been somewhat simplified by providing a carrier plate with special conduit connections into which solenoid valves with matching conduit connections may be plugged. This makes it possible to use only one connection to the source of the pressure fluid and such a switching unit may be relatively quickly produced by plugging in several valves. However, each solenoid valve still must be connected to electrical control lines and long control signal lines must be strung to the control unit. This is particularly disadvantageous when electronic control components in digital control circuits are used. The total expense in the installation of the control remains high and repairs remain difficult since all the electrical connections must be individually disconnected and, after the defective component has been replaced, must be connected again. Furthermore, the failure quotient in the electronic control parts is unavoidably high.

Austrian Pat. No. 263,472 provides another type of valve arrangement in which a central carrier plate holds the valve housings. The valve housings are mounted on the plate by quick-release clamping devices. The valves have the advantage that the valve housing may be removed from the plate without disconnecting the pressure fluid delivery because the carrier plate has special closures for the valve connections. However, the problem of the electrical connections remains.

It is the primary object of this invention to provide a control and monitoring arrangement of the indicated type which is comprised of a minimum of readily replaceable modules or units whose installation in the machine and replacement is easy and quick. It is another object of the invention to provide such an arrangement in which it is possible to detect any defective parts readily in case of machine breakdowns.

The above and other objects are accomplished according to the present invention with a control connected to each drive, each control being comprised of a switching module for actuating the drive, a control module cooperating with the switching module for controlling the actuation of the drive, a releasable coupling detachably connecting the control module to the switching module for ready replacement of the control module in the control, and a monitoring module connected to, and cooperating with, the control module.

With this arrangement, it has become unexpectedly simple to construct relatively complex modular controls by the use of mostly like modular components. Using such standard modules, it is possible to build complex controls with a relatively small number of different modules. The individual switching, control and monitoring elements required for the controls are provided in standard modules of the same dimensions, which may be pre-programmed and which may be combined into compact units, and replacement modules may be easily stored for rapid replacement and assembly of the individual modules. This is true for the modules carrying the pressure fluid conduits as well as for the modules incorporating the electrical or electronic control and monitoring components for the operation of the machine. All the modules may be coupled to a central control unit so that the standard modules may be flexibly adapted to various operations. The central control unit may also be used for synchronizing the functioning of the modules in a desired manner.

At least a major part of these modules may be prefabricated so that the time required for the installation of the modules in the machine may be considerably reduced. The control modules may incorporate various basic and freely programmable switching elements so that it is possible to use to a large extent standard structural components for the machine control. In case of a break-down and when repairs become necessary, a module is simply unplugged and a new module is plugged into the control. The defective module may then be repaired in special plants. Although the use of such prefabricated standard modules may involve the use of modules incorporating more components than may be required for the switching, control and monitoring of a particular drive to which it is connected, it is still more economical to use such standard modules even when they are not always fully utilized.

The above and other objects, advantages and features of this invention will become more apparent from the following detailed description of certain now preferred embodiments thereof, taken in conjunction with the accompanying drawing wherein.

Figure 1:
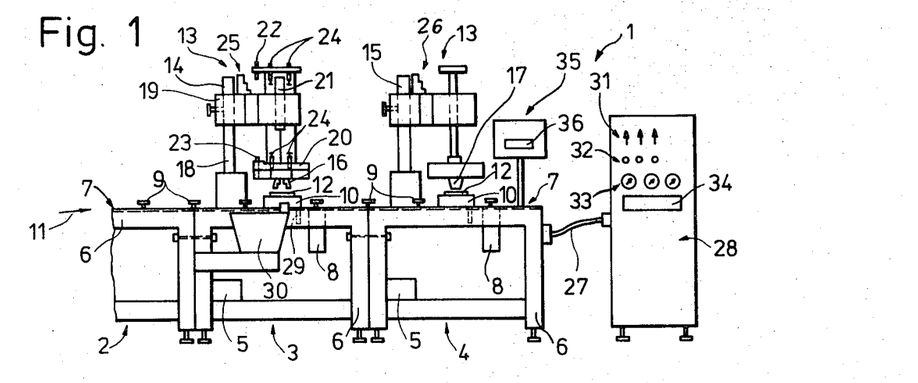
FIG. 1 is a schematic side elevational view of a portion of an assembly line, showing several work stations of the line and incorporating the control and monitoring arrangement of the invention.

Referring now to the drawing and first to FIG. 1, a machine for the manufacture of structural parts in two or more steps is illustrated as assembly line 1 comprising conveyor 7 for the assembly of workpieces 12 to manufacture the structural parts. The conveyor extends along a series of work stations arranged in linear alignment, three work stations 2, 3 and 4 being shown. In the illustrated embodiment, each work station has its own power plant 5 comprising sources of pressure fluid, such as hydraulic fluid, and electrical current for operating the drives and their control and monitoring arrangement. The work stations each have substantially identical support frames 6 mounted on the floor by vertically adjustable legs and the work stations constitute a modular assembly line in which individual work stations may be equipped with various mechanical handling devices or may be adapted to manual assembly operations, as may be desired and dependent on the specific manufacturing operation. The illustrated conveyor is comprised of a series of friction rollers 9 projecting upwardly from the upper support surfaces of the aligned work stations and driven by drives 8, such as electric motors, arranged on each work station. The spaced friction rollers frictionally engage the lateral faces of pallets 10 coming into contact therewith to move them along assembly line 1 in the direction of arrow 1. Each pallet 10 carries workpiece 12 clamped to the pallet and on which work is to be done at the respective work stations for the manufacture or assembly of a structural part. Work stations 3 and 4 are shown as automatic assembly stations equipped with suitable working or assembly mechanisms 13, such as rivetting devices, automatic screw drivers, presses and the like or, as shown in FIG. 1, workpiece handling apparatus 14 at work station 3 and insertion apparatus 15 at work station 4. Workpiece handling apparatus 14 is shown to comprise grippers 16 for gripping individual parts, such as contacts or the like, and centering them on workpiece 12 clamped to pallet 10 as the grippers are driven by the control and monitoring arrangement to be described hereinafter. Insertion apparatus 15 is shown to comprise vacuum-operated gripper 17 for positioning such parts as discs or rivets on workpiece 12, this apparatus, too, being operated by the control and monitoring arrangement hereinafter described.

Illustrated workpiece handling apparatus 14 comprises column 18 affixed to frame 6 of work station 3 and vertically adjustably supporting carrier 19 which may be held stationary in an adjusted vertical position on column 18 by a set screw of like fixing device. Carrier 19 defines guide bushings for two guide rods on which holder 20 is mounted. Pressure fluid drive 21, operated by compressed air or hydraulic fluid, enables holder 20 to be vertically adjusted with respect to carrier 19 and pallet 10 supported on, and moved along, assembly line 1. The illustrated drive is a cylinder-piston device or jack, the drive cylinder being affixed to carrier 19 and the piston rod of the drive being connected to holder 20. Gripping device 16 is mounted in the holder for movement in the direction of conveyor 7, i.e. the direction of arrow 11 (see also FIG. 2), powered by drive 37.

Apparatus 14 comprises monitoring device 22 for monitoring the vertical adjustment of holder 20 and monitoring device 23 for monitoring the horizontal movement of gripping device 16, the vertical movement of the holder being limited by upper and lower shock absorbers 24. Control 25 is arranged to operate drives 21 and 37 of handling apparatus 14 and like control 26 operates apparatus 15. Central connecting line 27 connects the controls of the apparatus on the respective work stations to central control unit 28. Furthermore, monitoring devices 29, one of which is shown for purposes of illustration in connection with work station 3, are arranged to monitor the position and advancement of pallet 10 for control of friction roller drives 8, and like controls are provided for conveyor apparatus 30 associated with respective ones of the work stations for delivering parts thereto for assembly with workpiece 12. All controls are connected to central control unit 28 by line 27. The central control unit is equipped with operating switches 31, push buttons 32, measuring instruments 33 and indicating instruments 34 for the control and monitoring of the assembly line operation and may provide proper control signals to the respective controls. If desired and as shown in connection with work station 4, individual work stations may be equipped with their own and independent monitoring and control units 35 having their own indicating instruments 36 and capable of providing control signals for the drives on the work station equipped therewith.

Figures 2, 3:
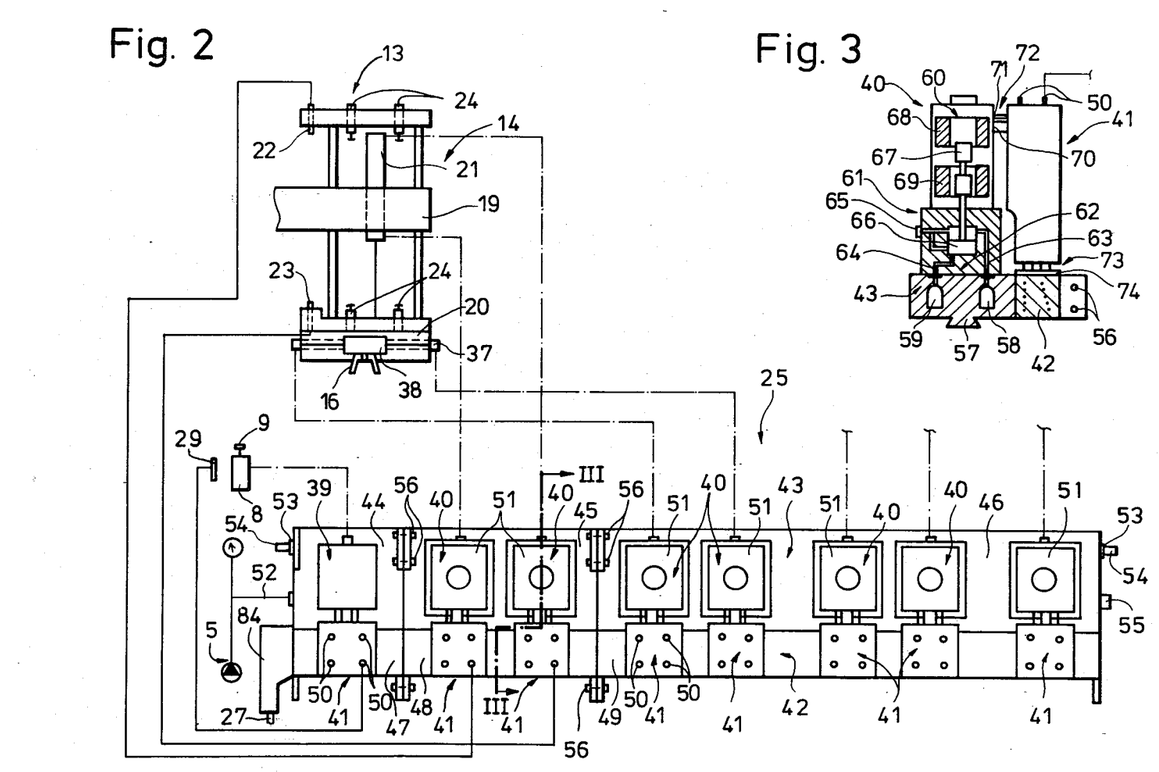
FIG. 2 is a view of a mechanism having moving parts for handling workpieces, the handling mechanism being associated with one of the working stations of FIG. 1 and an arrangement for controlling and monitoring the drives of the moving parts being shown to include a plurality of switching and control modules.
FIG. 3 is a sectional view along line III—III of FIG. 2 and showing a switching module and a distributing rail for a control module of the control and monitoring arrangement illustrated in FIG. 2.

FIG. 2 illustrates workpiece handling apparatus 14 in conjunction with control 25 connected to drive 8 for the conveyor, drive 21 for the vertical adjustment of holder 20 and drive 37 for the horizontal adjustment of gripper 16, on an enlarged scale and schematically. As shown, holder 20 is vertically glidably mounted on guide rods extending through carrier 19 and carrier 38 for gripping device 16 is mounted in a horizontally extending bore in holder 20, which constitutes the cylinder of pressure fluid drive 37 whose piston is formed by carrier 38.

In accordance with this invention, control 25 is comprised of switching module 39 for actuating drive 8 and pairs of switching modules 40 for actuating drives 21 and 37, respectively, control module 41 cooperating with each switching module for controlling actuation of the respective drive, a releasable coupling (to be described hereinafter) detachably connecting each control module to the associated switching module for ready replacement of the control module in the control, and a monitoring module (also to be described hereinafter) connected to, and cooperating with, each control module.

As shown schematically in FIG. 2 and will be described in more detail in connection with FIG. 4, the switching modules are plugged into distributor ledge 43 and the control modules are plugged into distributor rail 42, the distributor ledge and rail serving as carriers for the modules and each consisting of individual parts 44, 45, 46 and 47, 48, 49 each dimensioned and designed to receive a predetermined number of modules, this number being suitably selected in accordance with the operating requirements determined by the number of drives and moving parts to be controlled, such as for a like control 26 for operation of apparatus 13 at work station 4. In the illustrated embodiment, the distributor ledge and rail are integral with each other, and the individual parts are assembled into a control unit by screw bolts 56 interconnecting matching flanges on the distributor rails and ledges of the individual parts. This provides a compact control with combinations of switching and control modules readily adapted for various operations. Such controls may be readily combined in various adaptations and connected to the central control unit, the predetermined connections in each of the modules making wrong connections and consequent damage to control elements impossible when the modular assembly line is assembled and all parts thereof are coupled together.

The full effectiveness of controls 25 and 26 is further enhanced by providing control modules 41 with coupling devices 50 for detachably connected monitoring modules thereto so that suitable monitoring devices 22, 23 and 29 may monitor the operation of the respective drives.

In the illustrated embodiments, drives 8 for the conveyor rollers are electrical motors and switching modules 39 have electrical switching elements for operating the drives while drives 21 and 37 for moving holder 20 and gripper 16 of handling apparatus 13 are pressure fluid operated and switching modules 40 are constituted by solenoid valves 51 controlling the flow of the pressure fluid and the delivery thereof to the connected drive.

As shown in FIG. 2, conduit means 52 constituted by a suitable supply line delivers pressure fluid from a source of pressure fluid in power plant 5 from the source to drives 21 and 37 through solenoid valves 51, the pressure fluid supply line including a central distributing conduit defined in distributor ledge 43 and a collecting conduit in the ledge receiving the pressure fluid exhausted from the drives to return conduit 53. If the pressure fluid is compressed air, return conduit 53 is equipped with sound absorber 54 and if it is hydraulic fluid, the return conduit leads to a collecting tank (not shown). The end of supply line 52 opposite the pressure fluid receiving end is closed by stopper 55. The switching and control modules of the controls have substantially like connections for the releasable connection to the conduit means and to central control unit 28 which is detachably and replaceably connected to the controls. Individual distributor parts 44, 45, 46 and 47, 48, 49 are fluidtightly connected by O-rings or other types of gaskets or sealing devices.

Figure 4:
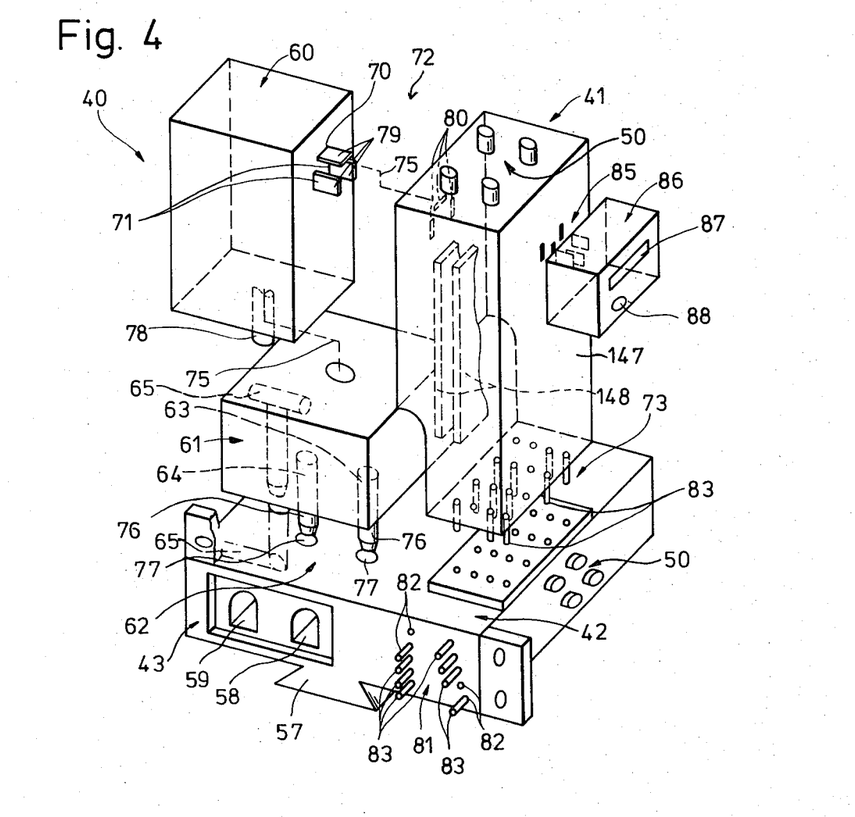
FIG. 4 is an exploded perspective view of a control arrangement comprising a distributing rail, a distributing bank, a switching module and a control module.

FIGS. 3 and 4 illustrate switching module 40 and associated control module 41, their releasable coupling and their mounting on distributor ledge 43 and distributor rail 42 in detail. As shown in the drawing, distributor ledge 43 has dove-tailed guide element 57 on the underside thereof, enabling the individual parts of the ledge to be aligned and combined on a support having a matching guide groove receiving guide elements 57. In this manner, any number of individual parts may be assembled to form a suitable control 25. Central supply conduit 58 for delivering the pressure fluid to the drives and collecting conduit 59 for returning the exhausted pressure fluid are shown in these figures.

Illustrated switching module 40 has a solenoid valve controlling the delivery of the pressure fluid to the connected drive and remote-controlled (see FIG. 5) actuating means 60 for operating the valve. The valve is incorporated into valve body 61 and remote-controlled actuating means 60 is incorporated into a separate body, the bodies being separate structural parts of standard dimensions, and further comprising plug means 78 for releasably and replaceably assembling the bodies. Furthermore, valve body 60 has coupling device 62 defining plug connections 76 to the conduit means for the pressure fluid, the connections including inlet conduit 63 to the valve and outlet conduit 64 from the valve. Plug connections 76 fit detachably into bores 77 in distributor ledge 43 and these bores lead into conduits 58 and 59. Valve body 61 further defines a pressure fluid conduit 65 for connection to the associated drive. Conduits 63, 64 and 65 terminate in a chamber in the valve body wherein control piston 66 is reciprocable for establishing the desired communication with respective ones of these conduits. A piston rod connects piston 56 to core 67 mounted for movement through coils 68, 69, the alternating energization of the coils reciprocating the core and piston 56 for actuation of the valve.

Releasable coupling device 72 detachably connects control module 41 to switching module 40, the illustrated coupling device comprising electrical connections to the cooperating control module. The electrical connections include inputs 70, 71 for cores 68, 69 of the solenoid actuating the valve. Illustrated coupling device 72 is an electrical plug connector 79, 80 and broken lines 75 indicate the manner in which the two bodies of the switching module and the switching and control modules are assembled to form a respective drive control. Monitoring devices may be plugged into control module 41 by plug-in coupling 50. Furthermore, control module 41 is plugged into distributor rail 42 by releasable coupling device 73 constituted by a multipleprong plug-in connector 73 whose prongs 83 mate with bores in a female connector part on the rail.

As is particularly clear from FIG. 4, releasable couplings 62, 72 and 73 enable the switching and control modules to be detachably connected to each other and to their supports, with all pressure fluid and electrical connections in place. Furthermore, the body incorporating actuating means 60 for the valve may be detachably connected to valve body 61 by plug-in element 78 which may have a bore receiving the piston rod of piston 66.

In a similar manner, adjoining individual parts 47, 48, 49 are plugged together by releassable coupling 81 of the same type as coupling 73. The arrays of plug-in prongs 83 in coupling devices 73 and 81 in cooperation with selected mating bores make it possible to plug the components together in selected positions so that the connections in distributor rail 42 will be connected only to selected ones of control modules 41. The same holds for the plug-in connection with the individual distributor rail parts, which may be so arranged that only some of the connections in one part will be connected to the connections of the adjoining part and, finally, by terminal plug 84 to central connection line 27 leading to central control unit 28.

The use of remote-controlled standard valves and the indicated variety of coupling them together enables the switching modules to perform a great number of different control functions in a very simple manner by merely plugging them together in selected fashions. Furthermore, dividing the switching module into two standard bodies which can be plugged together enables these modules to be more readily repaired. Experience has shown that the magnetic actuating means for the solenoid valve is more prone to break-downs than the mechanical part of the valve. Therefore, the two-part valve makes it possible to unplug the structural part containing the remote-controlled actuating means from the structural body constituting the valve body and quickly to replace it, thus greatly enhancing the servicing of the control.

The control functions of switching and control modules 40 and 41 are monitored by monitoring module 86 connected to, and cooperating with, control module 41, the illustrated connection being again provided by a detachable coupling device 85 which, as shown, may be similar to plug-in couplings 72 or 73. In the illustrated embodiment, monitoring module 86 has a signalling instrument 87 and may have push buttons or switches for "non-functioning" as well as push button 88 for "non-stop" operation. The monitoring module contains circuitry having an input receiving monitoring signals from monitoring devices 22, 23 and 29 as well as control signals from control module 41 through connecting lines in coupling 87 and an output connected to signalling instrument 87 for indicating the position of drives 9, 21 and 37 which, in turn, signals the condition or position of the handling apparatus at the work stations. This indication may be signalled simultaneously on indicating instrument 34 of central control unit 28 and/or indicating instrument 36 on work station control unit 35. Furthermore, if desired, it is not required that monitoring module 86 be associated with each control module 41. The monitoring module may alternatively be arranged in unit 28 or 35 so as to indicate to an operator any operating condition causing an interruption of the operation.

Figure 5:
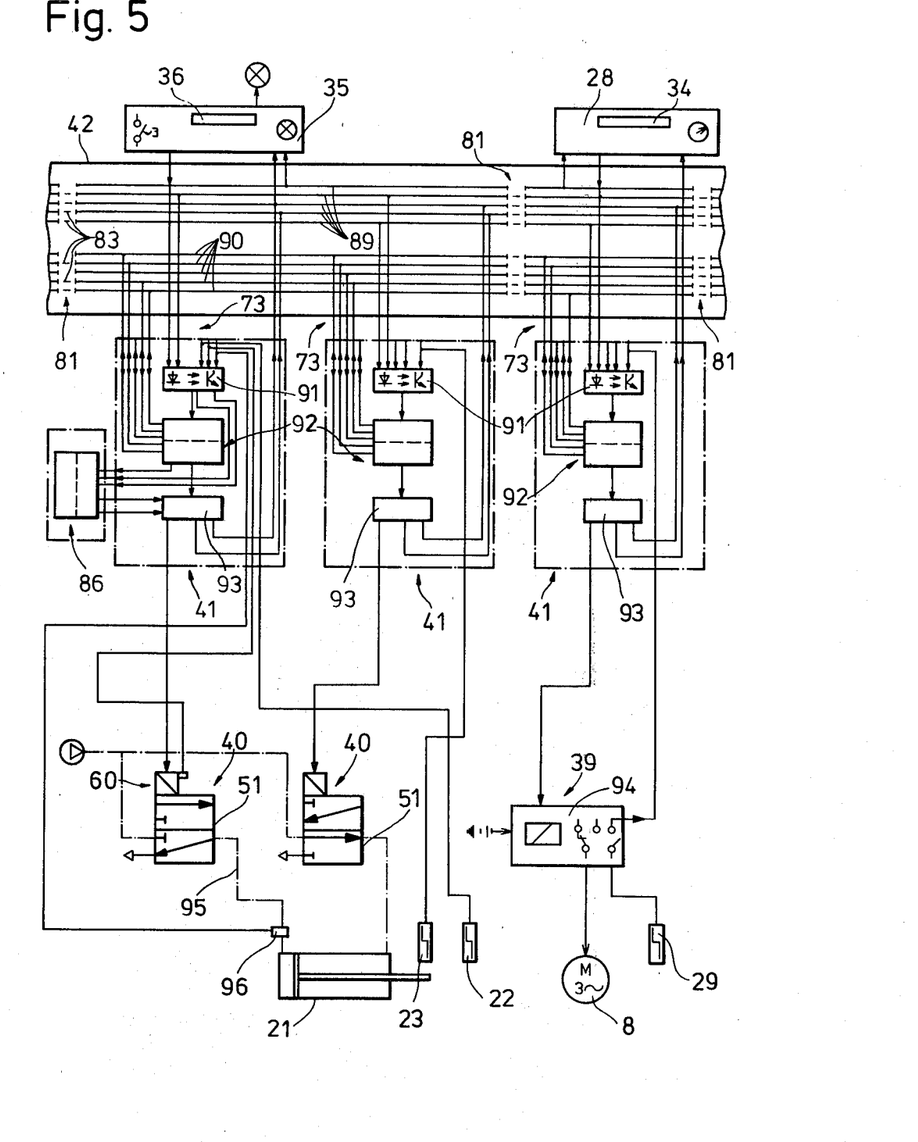
FIG. 5 is a diagrammatic circuit diagram for the control and monitoring arrangement associated with one of the work stations according to FIGS. 1 and 2.

FIG. 5 is a simplified circuit diagram for switching modules 39 and 40 and control module 41 mounted on each individual part 44, 45, 47 and 48 of distributor ledge 43 and distributor rail 42 (see FIG. 2) for operating drives 8 and 21. Monitoring module 86 is associated with one of the control modules 41 (see FIG. 4).

As shown in the drawing, distributor ledge 42 incorporates two groups of electrical connecting lines plugged together by connections 87 of plugs 81, i.e. control lines 89 and signalling lines 90. Control lines 89 supply control signals from central control unit 28 or from work station control unit 35 or from other remote control and monitoring units to opto-couplers 91 arranged in the circuit of each control module 41. By omitting any plug connection 81, 83, it is possible to disconnect any one of control modules 41 from receiving selected control signals transmitted by a disconnected control line 89. Furthermore, seleted control signals may be disconnected from any control module by suitably disconnecting prongs of plug connection 73 which connects the control module to distributor rail 42. In the illustrated embodiment, the lines in distributor ledge 42 serve also as central connecting line 27 since, for a better understanding, central control unit 28 is shown built into the distributor ledge.

Signalling lines 90 serve to transmit direct information between the logic elements of the control modules. Logic elements 92 may be constituted by integrated circuits of the analog or digital type or they may be micro-processors, as is well known in the computer art. The information signals are received from signalling lines 90 at the inputs of logic elements 92 wherein they are processed and the output signals of the logic elements are amplified in amplifiers 93 connected to the outputs of the logic elements, the amplified output signals being transmitted to control lines 89 for transmission back to central control unit 28, work station control unit 35 or other control modules, depending on the connections to the control lines. Furthermore, the amplified output signals from control units 41 are transmitted to switching modules 39 and 49 for operation of drives 8 and 21. At the same time, the input signals received by monitoring devices 22, 23 and 29, which may be proximity fuses, are transmitted to opto-couplers 91 whence they are transmitted as further inputs to logic elements 91 for processing therein.

The illustrated circuit enables each switching module to be associated with its own logic for control of the switching operation, i.e. the operation of the drive connected thereto. In this manner, the control may be limited exactly to those components required for the control function and the circuitry in control modules 41 may be reduced to the circuit components found indispensible for the desired operation. If it is desired to use standard control modules for wider use, additional circuit components may be provided in the module to provide for more complex control functions. Furthermore, if desired, only a single control unit 41 incorporating a suitably enlarged control circuit may be used for a plurality of, say five, switching modules. In any case, the advantage remains that the combination of switching and control modules is arranged close to the drives operated thereby. Releasable couplings 72, 73 and 81 between the switching and control modules, between the control modules and their carrier, and between the individual carrier parts, respectively, provide for an effective modular structure of the control which may be readily and quickly assembled, disassembled, varied, enlarged and reduced. While in the described and illustrated embodiment switching modules 39 and 40 are shown, respectively, as high-voltage switching device 94 and pressure fluid control valve 51, it will be obvious to those skilled in the art that the illustrated control may be used for actuating any type of switching or actuating element for driving moving parts of a machine for the manufacture of structural parts, such as an assembly line.

As shown in FIG. 5, it is particularly advantageous to connect a monitoring module 86 directly to at least one of the control modules 41 (see also FIG. 4). Pressure gage 96 is mounted in pressure fluid delivery line 95 leading from control valve 51 to drive 21 and a monitoring device is associated with magnetic valve actuating means 60, the output signals from gage 96 and the monitoring device being transmitted through opto-coupler 91 to monitoring module 86. The output signals from the monitoring module are transmitted to amplifier 93 which provides a corresponding, amplified monitoring signal to control line 89 for transmission to central control unit 28 and/or work station control unit 34 where any break-down may be optically and/or audibly indicated. If a micro-computer is installed in the control unit, such a break-down may appear as a print-out.

For example, if no output signal is received from monitoring device 22 associated with drive 21 after magnetic valve actuating means 60 has been energized and a resultant pressure rise is registered by gage 96, a print-out may appear at indicating instrument 34 or 36: "Drive 21 not actuated." This will enable the operator immediately to intervene to overcome the difficulty and valuable time will be saved in an effort first to locate the point of the breakdown. This will greatly reduce the down-time of the assembly line.

Clearly, the illustrated control with its electric or electronic programmable control component and an electric control circuit connected to the input of the valve actuating means provides a very compact switching-control module combination which is independently operable. This has the great advantage of providing decentralized controls for each valve or other switching element in the range of the drives actuated thereby. The electric connecting lines from the monitoring devices and the switching modules may be quite short, thus further reducing break-downs, and the decentralized controls may be readily serviced. The use of large switchboards with a multiplicity of different structural components and long connecting lines leading thereto are thus avoided.

Figure 6:
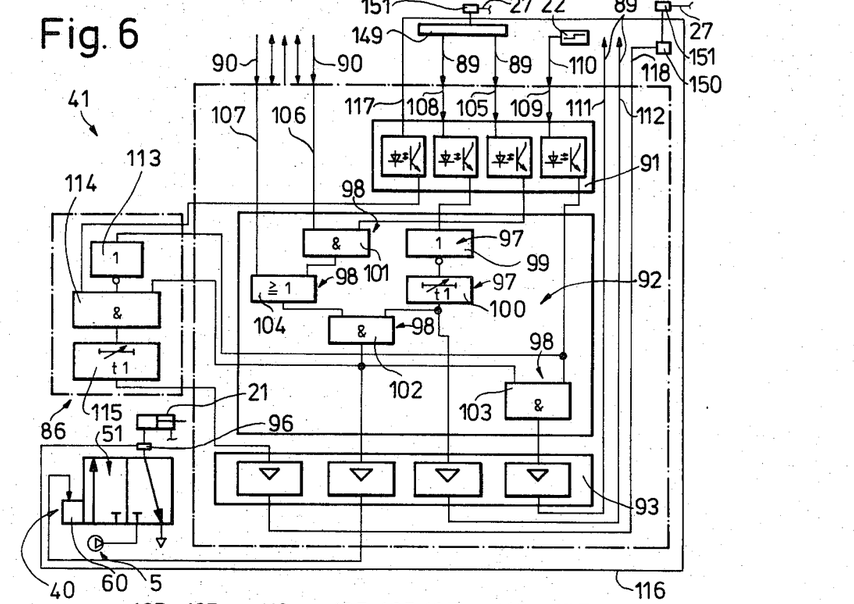
FIG. 6 is a circuit diagram for a switching module of the control and monitoring arrangement of FIGS. 2 and 4.

By way of example and to explain one possible control function of a control module 41, FIG. 6 shows its circuit including opto-coupler 91, logic element 92 and signal amplifier 93. Logic element 92 comprises control and switching components 97 and 98. Control component 97 is constituted by inverter 99 and timing stage 100 while switching component 98 is constituted by AND-gates 101, 102, 103 and OR-gate 104. When control line 89 transmits a signal to input 105 of logic element 92, the control signal is transmitted to opto-coupler 91 which causes the connecting line to AND-gate 101 of switching component 98 to assume switching condition L. For example, this control signal may be a starting signal transmitted by the operator from central control unit 28 (or work station control unit 35). If at the same time signalling line 90 transmits a signal to input 106 of the logic element, the second input line to AND-gate 101 also assumes switching condition L.

This switching condition at the output of AND-gate 101 or a switching condition L at input line 105 to OR-gate 104 of switching component 98, which may be generated, for example, by a starting signal from another control module 41 via signalling line 90, produces switching condition L at the output of the OR-gate. If input 108, which receives signals from the control unit through control line 89, is set for a time T1=0, for instance to wait for an overlapping operation of another control module 41, inverter 99 of control component 97 will cause the output of its timing stage 100 to assume switching condition L after time period T1 has elapsed. Since now both inputs of AND-gate 102 assume switching condition L, the output of this AND-gate transmits an L-signal which is transmitted amplified through amplifier 93 for actuating switching valve 51.

The L-signal at the output of AND-gate 102 and a signal at input 109 received by opto-coupler 91 through connecting line 110 from monitoring device 22 produces a switching condition L in the signalling line. This produces switching condition L at both inputs of AND-gate 103 of switching component 98, output signal L is transmitted from AND-gate 103 to amplifier 93 and the amplified signal is transmitted from output 111 of control module 41 via control line 89 to central control unit 28 or work station control unit 35.

The arrangement of switching components connected to the monitoring instrument associated with the drive connected to the control has the advantage of enabling information to be switched directly in the range of the switching module. Thus, a switching module may be actuated not only by a single input signal but by several signals, for example signals transmitted from different monitoring devices and from control signals of a series of control modules.

After the time set by timing stage 100 of control component 97 has elapsed, the output assumes switching condition L, the output signal is amplified in amplifier 93 and the amplified output signal is transmitted from output 112 via control line 89 to indicate the effectuation of the operation. For instance, this output signal may be transmitted to monitoring module 86 where it is indicated.

FIG. 6 also illustrates an embodiment of monitoring module 86 connected to, and cooperating with, control module 41. The illustrated monitoring module comprises inverter 113, AND-gate 114 and timing stage 115. Pressure gage 96 emits a monitoring signal corresponding to the pressure actuating drive 21 and transmission line 116 transmits this monitoring signal to input 117 of control module 41. Opto-coupler 91 transmits the monitoring signal from input 117 to AND-gate 114 in monitoring module 86, another input of this AND-gate being connected through inverter 113 and opto-coupler 91 with input 109 of control module 41. A third input of AND-gate 114 is connected to the output of AND-gate 102 of switching component 98 of the control module. The output of AND-gate 114 is connected through a timing stage and amplifier 93 to output 118 of control module 118.

The monitoring module operates in the following manner to indicate the position of drive 21 and the corresponding condition of workpiece handling mechanism 14:

When the output signal from AND-gate 102, amplified in amplifier 93, energizes actuating means 60 of valve 51, one of the three inputs of AND-gate 114 in the monitoring module simultaneously receives an input signal. As valve 51 is opened to permit pressure fluid from the pressure fluid source in power plant 5 to enter into one of the cylinder chambers of drive 21, the resultant change in the pressure is read by pressure gage 96 and a corresponding monitoring signal is transmitted by transmission line 116 from the pressure gage to input 117 of control module 41. This input signal is transmitted through opto-coupler 91 to a second input of AND-gate 114. Since monitoring device 22 for drive 21 has not yet been activated at this point, there is a zero input to inverter 113 of monitoring module 86. Therefore, the output of the inverter is at switching condition L. This results in all three inputs of AND-gate 114 receiving a signal so that an output signal is transmitted from AND-gate 114 to timing stage 115 immediately after pressure gage 96 transmits a signal. The timing stage, therefore, emits a starting signal for determining the time period. If the piston cylinder reciprocating under the pressure delivered to the cylinder chamber of drive 21 does not traverse the predetermined distance in the time period set for it, monitoring device 22 will not respond. Therefore, after the set time period has elapsed, an output signal, amplified in amplifier 93, will be transmitted from output 118 of control module 41 to any one of connected indicating instruments 34, 36 and 87, respectively, of central control unit 28, work station control unit 35 and monitoring module 86. Depending on the nature of the indicating instrument, this failure signal may indicate the actual type of failure involved. For example, if the instrument comprises a mino-computer, the following print-out may appear: "Drive 21 actuated - Monitoring device 22 does not respond." This will enable the operator immediately to attend to correction of the failure and to repair the damage without an extended down-time of the assembly line.

Obviously, the above-described and illustrated embodiment of monitoring module 86 is by no means limitative of this feature of the present invention but merely serves as an explanation for this function of the control. For example, the control circuit will in practice be so arranged that a print-out will appear at the indicating instrument to indicate "Valve actuating mechanism energized - no pressure delivered to drive 21" when pressure gage 96 fails to transmit a monitoring signal. The extent of refinement of the control and monitoring functions will depend entirely on the complexity of the machine and its operating mechanisms as well as the desired saving of time in eliminating damage or failure indicated by the control. For example, it is possible to arrange two or three or four monitoring modules 86 only at those work stations which require the longest time for the operations required for the manufacture of the structural parts because failures at these stations obviously will have a more invidious effect on the total operation of the machine or assembly line than a failure at a work station involving an operation of relatively short duration.

Figure 7:
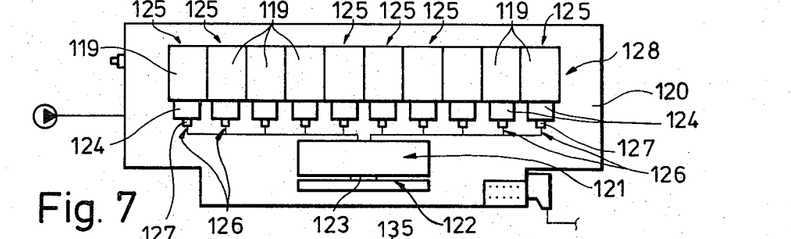
FIG. 7 shows schematically another embodiment of a control and monitoring arrangement according to the present invention.

FIG. 7 illustrates an embodiment of the control of this invention wherein a plurality of switching modules 125 each consisting of switching valve 119 and valve actuating means 124 are controlled by a single control module 121. The switching modules are arranged on a common carrier constituted by distributor ledge 120 and monitoring module 122 is connected to, and cooperates, with common control module 121. Multiple plug-in unit 123 similar to coupling 85 releasably connects the control and monitoring modules and the electrical connections between switching modules 125 and control module 121 is provided by coupling devices 126 constituted by multiple plug-in units 127. Distributor ledge 120 may be dimensioned to receive 3, 6, 9 or 10 switching modules to form a group of switching modules and the switching modules are plugged into the distributor ledge for ready detachment of any individual module.

Figure 8:
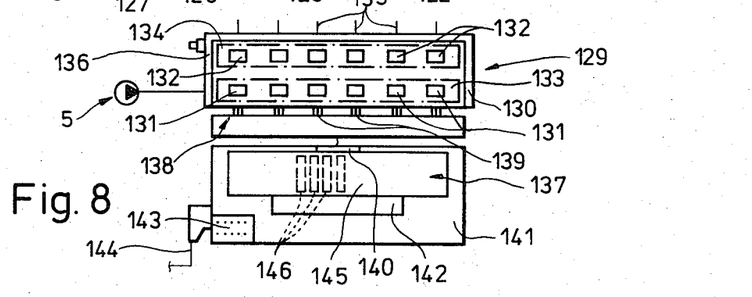
FIG. 8 illustrates schematically a modified arrangement with a switching module having several switching elements embodied in valves.

In the embodiment of FIG. 8, switching module 129 comprises carrier plate 130 mounting a plurality of switching valve bodies 132 and associated valve actuating mechanism bodies 131. To avoid replacement of the entire module in case of damage to a valve or actuating mechanism, valve bodies 132 and actuating mechanism bodies 131 may each be combined into single structural units 143 and 133, respectively. Thus, assuming an actuating mechanism is damaged, only structural unit 133 need be replaced on carrier plate 130.

This embodiment has the advantage of reducing the number of couplings considerably, compared to the embodiment shown in FIGS. 2 to 4. The structural parts are, therefore, much cheaper since the couplings constitute a considerable part of their cost. Furthermore, the number of individual parts of the control is advantageously reduced so that fewer parts need be inspected in case of a break-down. The parts are additionally subject to fewer failures because break-downs are most likely to occur at the couplings, i.e. either leaks in the pressure fluid lines at the points where they are coupled together or poor electrical contacts at the points where the power lines are plugged together. The embodiment of FIG. 8 has the added advantage that the arrangement of the connections for power transmission lines 135 and the conduit means for the pressure fluid delivered from power plant 5 in distributor ledge 136, on which switching module carrier plate 130 is mounted, enables these transmission lines and conduit means to be installed independently of switching modules 129.

Distributor rail 138 connects the switching module mounted on carrier plate 130 to control module 137, valve actuating mechanisms 131 of switching module 129 being connected to the control module by multiple plug-in couplings 138. Multiple plug-in coupling 140 connects carrier plate 141 of control module 137 to distributor rail 138. Control module 137 and monitoring module 142 are independently plugged into carrier plate 141. As schematically indicated, the carrier plate has a female connecting field 143 for receiving plug-in connecting prongs for detachably connecting any devices required for the operation, such as electromagnetic proximity fuses or limit switches. Central connecting line 144 may be plugged into carrier plate 141 to connect the control to a central control unit (see 27 in FIG. 2).

The use of a carrier plate for the control module makes it possible to install the connecting lines without control module 137 and monitoring module 142 being in place. Therefore, if these modules must be serviced or replaced, no connecting lines need be disconnected. The damaged module is simply detached and a new module is plugged into the carrier plate. This again considerably reduces the time required for servicing the control.

Carrier plate 130 may be dimensioned for any given number of switching elements, such as valves and their associated actuating mechanisms or electrical relays or switches, and groups of 3, 6 or 9 switching elements are preferred. It is most advantageous for the storage of substitute parts as well as for the operation of the machine to combined 3, 6 or 9 structural parts into a block or unit constituting a replaceable module even if any specific control does not require that many parts for its operation. In such a case, the installed module provides a reserve so that subsequently added drives may be controlled by activating additional module parts without requiring an installation of additional modules.

Control module 137 will be adapted for more universal use if its housing 145 carries its electric control circuits in the form of printed circuits 146 which are plugged into the housing and are, therefore, readily replaceable. This will much simplify and expedite the repair and/or replacement of damaged parts of the control module and will enable housing 145 to be used for modules with different control characteristics.

As has been shown in FIG. 4, housing 147 of control module 41 may also carry a plurality of replaceable printed circuits 148. As has been indicated in this figure, in this embodiment, too, pressure fluid outlet 65 and coupling device 62 need not be arranged directly on valve body 61 and control module housing 147 but may be provided in distributor ledge 43 so that, when the valve body is replaced, the connecting lines need not be disconnected.

As has been shown in FIG. 7, control module 121 and monitoring module 122 may be mounted on a common carrier plate which has a plug-in section into which monitoring devices may be plugged, as well as a plug for connecting a central power line to the control unit and required connections to switching elements for electrically operated drives.

FIG. 6 illustrates a modification of the control circuit wherein converter unit 149 connects central power line 27 to control lines 89 leading to inputs 105 and 108 of control module 41. Similarly, output 118 of the control module may be connected to line 27 by converter unit 150. Input and output converter units 149 and 150 may be constituted by accumulators and converters of the input and output signals of control module 41. The converter units may be analog/digital converters or converters of electrical pulses into electro-optical pulses. With the latter type of converters, it is possible to transmit the information as light pulses over longer distances and without substantial failures at couplings.

Intermediate signal storage devices 151 may be connected between converter units 149 and 150 and central power supply line 27 to enable a bundled transmission of information between control module 41 and central control unit 28.

Each control of the present invention can be operated independently, with the programmable switching and control components contained in the control module detachably connected to the switching module or to a group of switching modules whose controlled operation actuates the machine drives connected thereto. The electronic switching components in the control modules make it possible to switch information in the range of the switching module to which the control module is connected. Thus, the switching module may be actuated not only by a control signal from the central control unit or the work station control unit but by a variety of signals generated, for example, by monitoring devices associated with the drives and signals from preceding or subsequent control modules arranged along the assembly line and controlling a series of assembly operations.

The use of multiple plug-in couplings enables all of the connections to be made securely when the controls are assembled in the control and monitoring arrangement of the invention without causing any damage to the modules or failures in the proper connection of the pressure fluid conduits and the electrical transmission lines. Where each control module has a coupling device enabling a monitoring module to be connected thereto, the control module may be subsequently provided with such a monitoring module when this becomes desirable. In this manner, monitoring signals may be delivered to the control module so that its control functions may be directed by data and information derived from monitoring devices associated with the drives, thus further enhancing the accuracy and efficiency of the drive controls. In the illustrated embodiments, the control module also has a coupling for connecting its electrical control circuit to a central power supply line leading to a central control unit and/or a control unit at each work station or selected work stations. In this manner, different control modules connected to different switching modules may be synchronized by a central control unit to assure a rational sequence of all the interrelated drive movements controlled by the respective controls. Thus, the decentralized arrangement of the controls still makes it possible to control the entire arrangement centrally by a suitable program.

Where the control module incorporates a microprocessor control useful for controlling a plurality of switching modules and the micro-processors of the control modules are synchronized by timing signals from a central control unit, the variety and number of control functions along the assembly line may be further enhanced.

By using output and input converters for connecting the control module to the central power line leading to a central control unit, the output converter being an accumulator and converter of the output signals from the control module and the input converter distributing the input control signals to the electronic programmable control unit in the module, only a few transmission lines will be needed even if a multiplicity of signals are transmitted from the central control unit to the control modules. Thus, when the central power line sections are plugged together, sources for power line failures will be reduced.

The preferred embodiments described and illustrated herein show, by way of example, the wide variety of electronic and computer technology useful in the control of the invention. By using time-controlled intermediate signal storage devices at the inputs and outputs of the control modules, information bits coming from different sources at different times may be combined into a pulse train and may then be transmitted in unison to the control module. This further increases the range of the control and monitoring arrangement for being responsive to a large amount of information.

Using multiple plug-in couplings for the releasable electrical connection of the various electrical lines makes it possible to vary the connections to different numbers of lines for a variety of control modules, simply by changing the number of connecting prongs of the couplings.

The above described and illustrated arrangement of a monitoring module connected to the control module makes it possible at all times to indicate the operating condition of the assembly line so that the operator has the opportunity to note not only the switching condition of, or any failure in, the control and monitoring arrangement but also to note the actual condition of the machine and the position of the moving parts of its assembly mechanisms. This enables the operator rapidly to determine whether there is a mechanical defect in the machine—which, experience shows, accounts for 90% of all failures—or whether the defect is in the control and monitoring arrangement. Thus, if the monitoring module indicates that, for example, the gripping device has failed to engage a workpiece, the operator need only take a look to see whether this may be due simply to the failure of the conveyor delivering the workpieces to the assembly line. If this is the case, this failure may be rapidly corrected or any other such source of assembly line break-down may be suitably and rapidly corrected. Often, this correction can be made before the production line must be halted.

In the illustrated embodiments, the modules are mounted on carriers constituted by distributor ledges or rails having electrical transmission lines and internal pressure fluid conduits, thus providing considerable stability and great resistance to mechanical wear. This makes the control and monitoring arrangement useful for manufacturing machines subject to considerable mechanical wear and stresses without danger to damage to the control lines. Furthermore, the electrical lines may be shielded to avoid being influenced by other electrical circuits so that direct information may be exchanged between the logic elements and switching components of a number of control modules adjoining each other or arranged at a distance.

It will be obvious to those skilled in the art that the control and monitoring arrangement illustrated and described hereinabove is by no means limited to the specific electrical control circuit components shown but that any such components of equivalent function may be used. The same holds for the switching elements of the switching modules which are adapted to the types of drives to be controlled thereby, pressure fluid flow control valves and electrical switches and relays being shown only by way of example. Furthermore, the control and monitoring arrangement of the present invention may be used not only in manufacturing and assembly machines for controlling the drives of moving machine parts but wherever drives are to be controlled, such as in vehicles and the like, i.e. wherever a control and monitoring arrangement is required without involving complex mounting operations and which is to be put in place rapidly. Advantageous applications will be found in the field of packing machines, road vehicles, rail vehicles and airplanes, as well as a variety of complex manufacturing and working machines.

What is claimed is:

1. A control and monitoring arrangement for drives of moving parts of a machine for the manufacture of structural parts in two or more steps, which comprises a control connected to each one of the drives, each control being comprised of a switching module for actuating the drive, a control module cooperating with the switching module for controlling actuation of the drive, a releasable coupling detachably connecting the control module to the switching module for ready replacement of the control module in the control, and a monitoring module connected to, and cooperating with, the control module and further comprising a source of energy, conduit means for delivering the energy from the source to each drive, a central control unit detachably and replaceably connected to the controls, and the switching and control modules of the controls having substantially like connections for the releasable connection to the control means and to the central conduit unit.

2. The control and monitoring arrangement of claim 1, wherein the machine is an assembly line comprising a conveyor for the assembly of workpieces to manufacture the structural parts, the conveyor extending along a series of work stations arranged in linear alignment, and each work station having a respective one of the drives with the control connected thereto for moving respective ones of the workpieces along the assembly line, and at least some of the work stations having a mechanism with a moving part and a respective one of the drives therefor, with a respective control connected thereto.

3. The control and monitoring arrangement of claim 1, wherein the source of energy is pressure fluid.

4. The control and monitoring arrangement of claim 3, wherein the switching module of the control of the drive for the moving part of the mechanism has a valve controlling the delivery of the pressure fluid to the connected drive, a remote-controlled actuating means for operating the valve, and the control comprises coupling devices defining the connections of the switching module to the conduit means for the pressure fluid, the connections including an inlet conduit to the valve and an outlet conduit from the valve, and including the releasable coupling incorporating electrical connections between the switching and control modules, the electrical connections including an input connected to the valve actuating means for controlled operation of the valve.

5. The control and monitoring arrangement of claim 4, wherein the valve is incorporated into a first structural part constituting a valve body, the remote-controlled actuating means is incorporated into a second structural part constituting a separate body, the bodies being structural parts of standard dimensions, and further comprising couplings for releasably and replaceably assembling the bodies.

6. The control and monitoring arrangement of claim 4, wherein the switching module has a plurality of said valves and of said remote-controlled actuating means for operating the valves.

7. The control and monitoring arrangement of claim 6, wherein the valves and the actuating means are incorporated into separate structural units.

8. The control and monitoring arrangement of claim 4, wherein the control module of each control has an electronic programmable control component and an electrical control circuit connected to the valve actuating means.

9. The control and monitoring arrangement of claim 8, wherein the control circuit comprises an electronic switching component, and further comprising a monitoring instrument associated with the drive connected to the control, the switching component being connected to the monitoring instrument.

10. The control and monitoring arrangement of claim 9, wherein the control and switching components are integrated circuits, the control module comprising a housing and the integrated circuits being printed circuit boards replaceably mounted on the housing.

11. The control and monitoring arrangement of claim 9, further comprising a coupling device on the control module, the coupling device incorporating electrical connections connecting the switching component to the monitoring instrument.

12. The control and monitoring arrangement of claim 8, further comprising a coupling arranged on the control module and power supply lines in the coupling connecting the electrical control circuit to a central power supply line.

13. The control and monitoring arrangement of claim 12, wherein the control module further comprises a micro-processor for control of the switching module and the central power supply line connects the central control unit to the micro-processors of the control modules for synchronizing the operation of the micro-processors.

14. The control and monitoring arrangement of claim 13, wherein the central control unit is arranged to transmit timing pulses to the micro-processors for synchronizing the operation thereof.

15. The control and monitoring arrangement of claim 13, wherein a plurality of the switching modules are controlled by each control module.

16. The control and monitoring arrangement of claim 13, further comprising an output converter unit and an input converter unit connecting each control module to the central power supply line and central control unit, the output converter unit being an accumulator and converter of the output signals of the control module and the input converter unit being arranged to distribute the control signals to the electronic programmable control unit.

17. The control and monitoring arrangement of claim 16, wherein the converter units include opto-couplings.

18. The control and monitoring arrangement of claim 16, wherein the converter units include amplifier stages.

19. The control and monitoring arrangement of claim 16, wherein the converter units include devices for converting electrical pulses into light pulses.

20. The control and monitoring arrangement of claim 16, wherein the converter units include analog/digital converters.

21. The control and monitoring arrangement of claim 16, further comprising intermediate signal storage devices connected between the converter units and the central power supply line.

22. The control and monitoring arrangement of claim 21, wherein the signal storage devices are time-controlled.

23. The control and monitoring arrangement of claim 4, wherein the releasable coupling is a multiple plug-in unit providing the electrical connections.

24. The control and monitoring arrangement of claim 4, wherein one of the coupling devices is a plug-in unit comprising orifice means leading to the conduit means for the pressure fluid and the switching module has matching coupling conduit means for plugging into the orifice means.

25. The control and monitoring arrangement of claim 24, wherein the orifice means is self-sealing on release of the coupling conduit means from the orifice means for fluid-tightly closing the orifice means.

26. The control and monitoring arrangement of claim 1, further comprising a carrier and the control module being plugged into the carrier, coupling devices arranged on the carrier for said connections and a power supply unit, the connections including power supply lines to the central control and power supply units as well as to the switching and monitoring modules.

27. The control and monitoring arrangement of claim 26, further comprising a monitoring instrument associated with the drive connected to the control, the carrier including a plug-in section for plugging a connection to the monitoring instrument into the carrier.

28. The control and monitoring arrangement of claim 26, wherein the carrier is comprised of a plurality of detachably and replaceably connected sections, further comprising plug-in devices between the carrier sections for completing the connections between the sections.

29. The control and monitoring arrangement of claim 3, further comprising a carrier and the switching module being plugged into the carrier, and coupling devices arranged on the carrier for the conduit means for connection to the source of pressure fluid and to the drive.

30. The control and monitoring arrangement of claim 29, wherein the conduit means comprises a line for supplying the pressure fluid to the drive and a line for returning the fluid from the drive, the switching module comprises a switching element and the connections comprise a connection to the switching element, the lines and connections being arranged in the carrier, and the carrier having plug-in conduits for receiving the lines.

31. The control and monitoring arrangement of claim 1 or 2, wherein the monitoring module is connected by the switching and control modules to the drive for monitoring the controlled actuation of the drive, the monitoring module comprising switching means actuatable when the actuation of the drive fails.

32. The control and monitoring arrangement of claim 31, further comprising an indicating device indicating the position of the drive and having an input connected to the drive, a failure signal transmitted from the drive to the input actuating the switching means.

33. The control and monitoring arrangement of claim 32, further comprising a central control unit detachably and replaceably connected to the controls, the central control unit having the indicating device, and an electrical control circuit connecting the modules with the central control unit.

* * * * *